(12) United States Patent
Hanada et al.

(10) Patent No.: US 6,233,120 B1
(45) Date of Patent: *May 15, 2001

(54) MAGNETIC DISK DEVICE

(75) Inventors: Kazuyoshi Hanada, Hadano; Toshihisa Okazaki; Satomitsu Iami, both of Odawara, all of (JP); Masayuki Honchi, Albany, CA (US); Hideyuki Takagi, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/443,303

(22) Filed: Nov. 19, 1999

Related U.S. Application Data

(63) Continuation of application No. 08/979,779, filed on Nov. 26, 1997, now Pat. No. 5,995,327.

(30) Foreign Application Priority Data

Nov. 27, 1996 (JP) ................................. 8-316400

(51) Int. Cl.[7] ..................................... G11B 5/49
(52) U.S. Cl. ........................................ 360/244.2
(58) Field of Search ........................... 360/244.2, 244, 360/265.7

(56) References Cited

U.S. PATENT DOCUMENTS 5,305,169  4/1994  Anderson et al. .
5,995,327 * 11/1999  Hanada et al. ................. 360/104

FOREIGN PATENT DOCUMENTS

| 2-292784 | 12/1990 | (JP) . |
| 5-325459 | 12/1993 | (JP) . |
| 6-124424 | 5/1994 | (JP) . |
| 8-45205 | 2/1996 | (JP) . |

* cited by examiner

Primary Examiner—David Davis
(74) Attorney, Agent, or Firm—Antonelli, Terry, Stout & Kraus, LLP

(57) ABSTRACT

A magnetic disk device having a base and a cover; a magnetic disk recording information on a recording surface thereof facing the base or the cover; a spindle motor fixed to the base and rotating the magnetic disk; a head for recording and reproducing the information to and from the recording surface of the magnetic disk; a slider having the head mounted thereto; a first suspension supporting the slider; a head arm provided between the magnetic disk and the base or the cover and supporting the first suspension on the side of the recording surface; and a carriage fixed to the base and swinging the head arm, moving the head in a radial direction of the magnetic disk and positioning the head. The magnetic disk device also has a second suspension provided on the base side or the cover side of the head arm and having a natural frequency substantially equal to a natural frequency of the first suspension.

20 Claims, 4 Drawing Sheets

MAGNETIC DISK DEVICE

CROSS REFERENCE TO RELATED APPLICATION

This is a continuation of U.S. application Ser. No. 08/979,779, filed Nov. 26, 1997, now U.S. Pat. No. 5,995,327 the subject matter of which is incorporated by reference herein.

BACKGROUND OF THE INVENTION

This invention relates to a magnetic disk device as one of storage devices of computers. More specifically, this invention relates to a magnetic disk device having a positioning structure suitable for reducing the size and the thickness of a magnetic disk device, for achieving a large storage capacity and a high recording density and for improving an information processing speed.

JP-A-8-45205 (hereinafter called the "first related art example") and JP-A-5-325459 (hereinafter called the "second related art example") describe a positioning mechanism for accomplishing the reduction of the size and the thickness of the device, a large capacity, high recording density and a high information processing speed. The first and second related art examples improve positioning accuracy by restraining the vibration occurring in the magnetic disk device.

The first related art example prevents the vibration of a voice coil motor resulting from the movement of a carriage from being transmitted to a base by fixing the voice coil motor and the base through viscoelastic members, or the like.

The second related art example restricts the residual vibration by a spring arm at the time of seek by providing a vibration absorption member to the spring arm.

Because it has been customary to package the magnetic disk device into notebook type personal computers, the reduction of its size and thickness and a large storage capacity and a high recording density of the disk device have been required in the past. Because the notebook type personal computers are mainly of the type which incorporate a battery and can be operated even in the absence of an alternating current outlet, low power consumption is another essential requisite. In addition, reliability and low price of the device and a higher information processing speed are required naturally.

To satisfy these requirements, a positioning mechanism of the magnetic disk device must reduce as much as possible a relative position error between the disk and the head. Factors of the position error include the vibration of the head and a carriage swinging portion for supporting the head and the vibration of the disk and a spindle motor rotation portion for supporting the disk.

If the amplitude of the vibration is great when the head reads out the information recorded circumferentially on the disk surface, the head reads also the information adjacent to the target position in the radial direction. Therefore, the space of the information in the radial direction must be increased. However, a large capacity cannot be achieved in this case, and the reduction of both size and thickness cannot be attained.

The vibration of the head increases the number of times of repetition of correction of the head position in positioning control and requires a long settling time before positioning is made correctly to the target position. Therefore, the vibration of the head also impedes a higher information processing speed of the magnetic disk device.

To use the full surface of the mounted disk, a head arm of a carriage includes a portion at which two heads are mounted via suspensions or spring arms as shown in FIG. 6 and a portion at which one head is mounted via a suspension as shown in FIG. 7. The portion having one head mounted via a suspension thereto involves the problem that the vibration (amplitude) is great.

The systems described in the first and second related art examples have been examined as means for solving the problem but they are not entirely satisfactory for restraining the vibration (amplitude) of the portion at which one head is mounted via a suspension.

SUMMARY OF THE INVENTION

In view of the problem of the related art technologies described above, an object of the present invention is to provide a magnetic disk device equipped with a positioning mechanism suitable for restraining the vibration (amplitude) of a portion at which one head is mounted via a suspension, for not increasing the size and the thickness of the device, for achieving a large storage capacity and a high recording density and for improving an information processing speed.

The magnetic disk device according to a first aspect of the present invention is applied to a magnetic disk device including a magnetic disk for recording information, a spindle motor for holding and rotating the magnetic disk, a head assembly including a head, gimbals and equipped with a slider and a suspension for recording and reproducing information to and from the magnetic disk, a head arm portion for fixing the heads, a carriage for moving the heads on a disk surface in a radial direction and positioning them and a head disk assembly including a base and a cover for holding these members and closing them off from external air. This magnetic disk device has the following features.

A member having a natural frequency equal to that of the head under the packaged state is disposed on the opposite surface of a head arm to which one head is mounted via a suspension.

The magnetic disk device according to a second aspect of the present invention has the following feature. In the first aspect of a invention described above, the profile of the member described above, which is projected in a direction perpendicular to the magnetic disk-surface, is similar to the profile of the head and suspension projected in the direction perpendicular to the magnetic disk surface, or does not swell out from the profile of the head and suspension projected in the direction perpendicular to the magnetic disk surface.

The magnetic disk device according to a third aspect of the present invention has the following feature. The member described above is mounted to the head arm by the same means as that of the head.

Incidentally, a member which generates the vibration equal to that of the arm having two heads mounted thereto via suspensions may be disposed on the opposite surface of the head arm having one head mounted via a suspension thereto. Furthermore, the second and third aspect features described above may likewise be applied to the member disposed on the opposite surface of the head arm having one head mounted via a suspension thereto so as to generate the vibration similar to that of the arm having two heads mounted thereto.

DESCRIPTION OF THE PREFERRED EMBODIMENTS

Hereinafter, the present invention will be explained in further detail with reference to the accompanying drawings.

Figure 1:
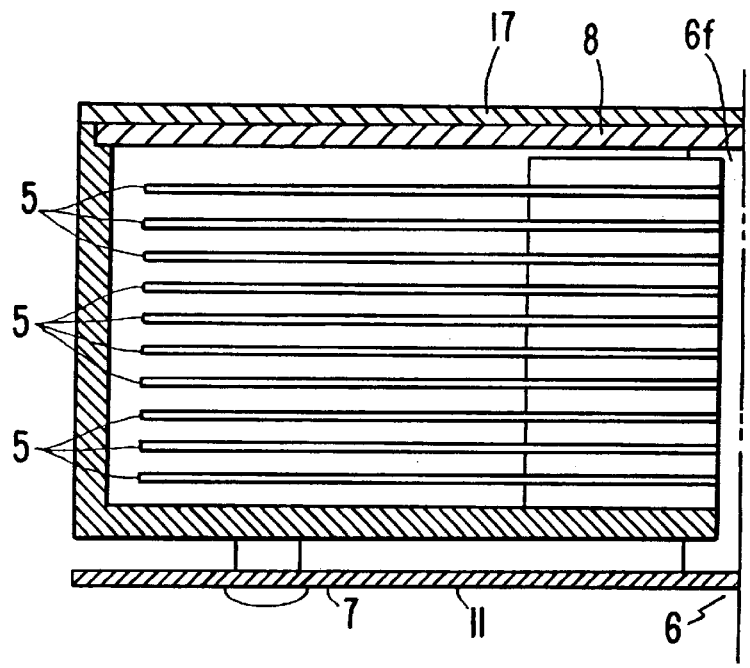
FIG. 1 is a sectional side view of a left end portion when the basic structure of a magnetic disk device according to an embodiment of the present invention is divided into three sections.
Figure 2:
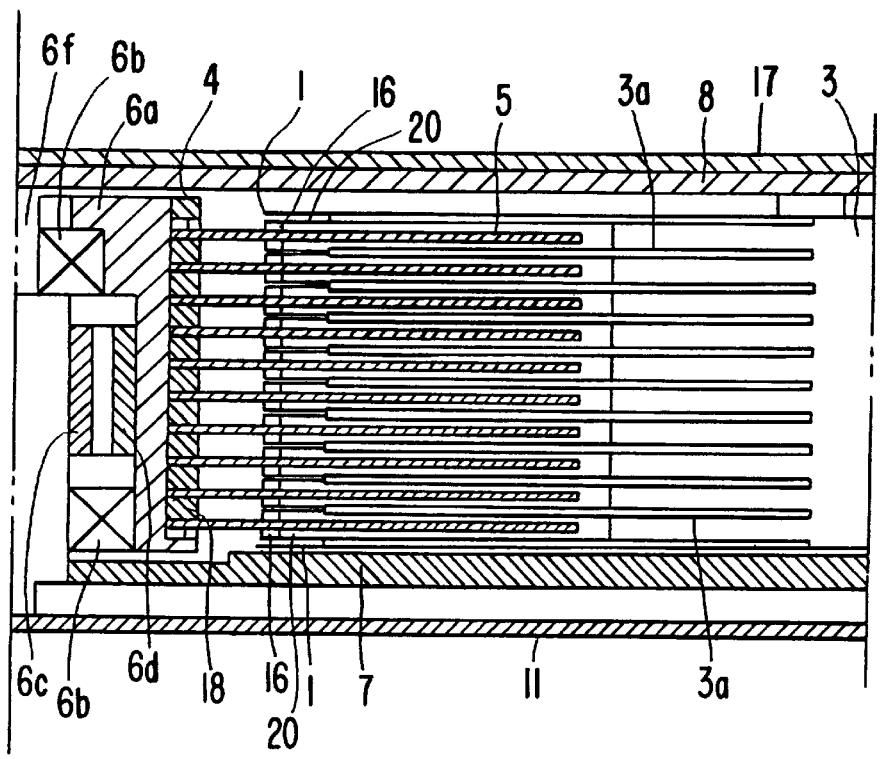
FIG. 2 is a sectional side view of a center portion when the basic structure of the magnetic disk device of the embodiment of the present invention is div.:(Oed into three sections.
Figure 3:
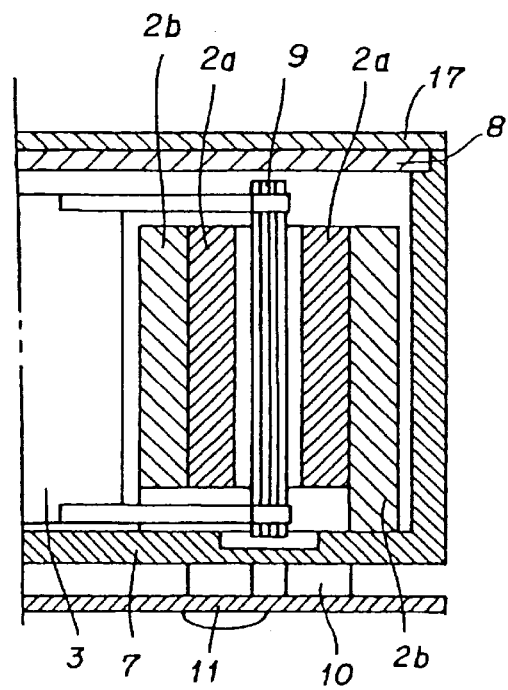
FIG. 3 is a sectional side view of a right end portion when the basic structure of the magnetic disk device of the embodiment of the present invention is divided into three sections.
Figure 4:
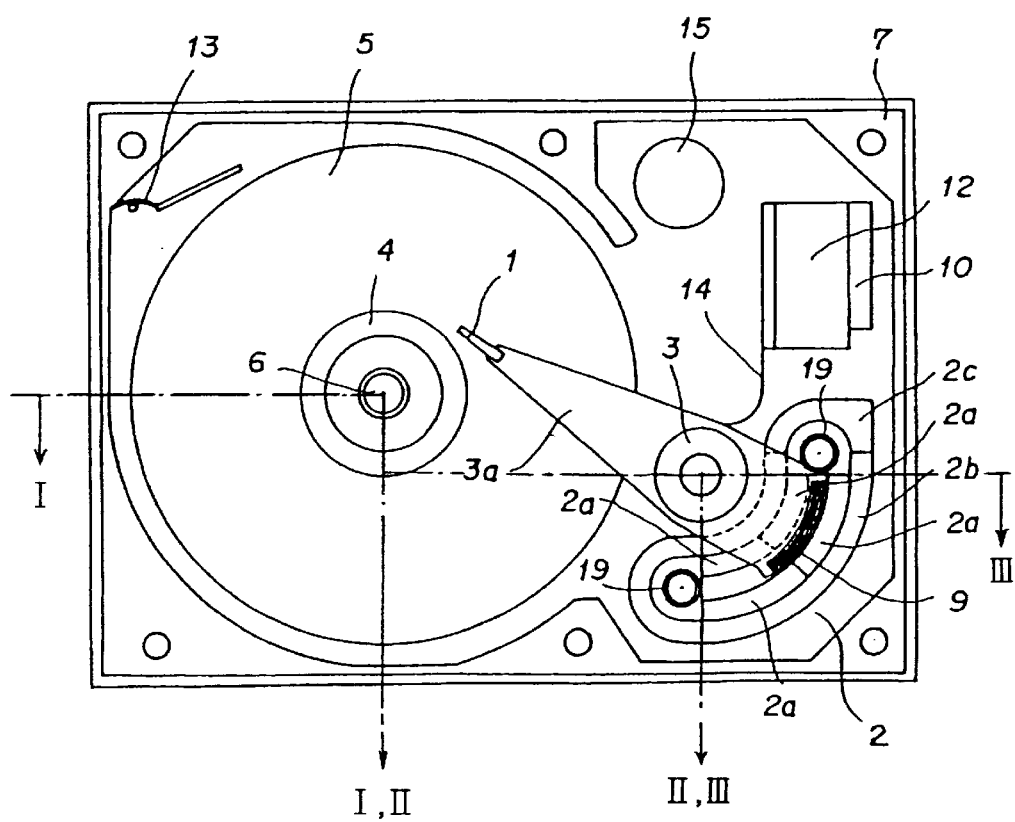
FIG. 4 is a top view (when a cover is open) showing the basic structure of the magnetic disk device according to the embodiment of the present invention (see FIGS. 1 to 3)

FIGS. 1 to 3 are partial sectional views each showing the basic structure of a magnetic disk device according to an embodiment of the present invention. These drawings show the magnetic disk device when it is divided into three sections. FIG. 4 is a top view (when a cover is open) showing the basic structure (equivalent to the one shown in FIGS. 1 to 3) of the magnetic disk device of this embodiment. In the description which follows, the term "head" represents a gimbal portion to which a slider is mounted.

In the basic structure of the magnetic disk device shown in FIGS. 1 to 3, a disk 5 (FIG. 1) using aluminum or glass as a substrate material and having a magnetic film formed on the surface thereof for magnetically holding information is driven for rotation by a spindle motor 6. The spindle motor 6 has the following structure. The spindle motor 6 includes a motor shaft 6f made of a stainless steel and a hub 6a made of aluminum and allowed to precisely rotate through motor bearings 6b (FIG. 2) pushed into the upper and lower parts of the motor shaft 6f. The hub 6a is pushed in advance in an axial direction by a spring (not shown). A motor magnet 6d made of a permanent magnet is fixed to a motor coil 6c fixed between the motor bearings 6b of the motor shaft 6f an d to the inner surface of the hub 6a opposite to the motor coil 6c, and the hub 6a is allowed to rotate when a current is supplied to the motor coil 6c. A plurality of disks 5 are fitted to the hub 6a through disk spacers 18, and the disks 5 and the disk spacers 18 are fastened to the hub 6a by using clamp rings 4 made of aluminum, stainless steel or iron and having a ring shape. Each clamp ring 4 is fastened by shrinkage fit or may be fastened to the upper surface of the hub 6a by a screw.

A head 16 is caused to float up over the surface of the disk 5, which is driven for rotation, while a predetermined space of not greater than 0.1 micron is kept. The head 16 includes a solenoid toil for electromagnetic conversion between electric signals for magnetically writing or reading information and a magnetic field, and is made of ferrite or thin metallic film. To correctly position the head 16 onto the surface of the disk 5, a carriage 3 made of aluminum or magnesium is used. The carriage 3 is driven and positioned by a voice coil motor 2 comprising a coil 8 formed by winding an aluminum or copper wire having an insulating film, the magnet 2a of the permanent magnet (FIG. 3) and a yoke 2b for supporting the magnet 2a and forming a magnetic circuit. One of the yokes 2b includes two kinds of magnets, that is, a magnet 2a serving as an S pole to the coil 9 and a magnet 2a serving as an N pole to the coil 9. These magnets are fixed along an arc on which the coil 9 moves in a transverse direction from the center of a moving angle of the coil 9 when the head 16 moves on the surface of the disk 5 so as to write or read the information (FIG. 4). The magnet 2a is fixed at a position of the other yoke 2b opposite to the position of the magnet 2a while interposing the coil 9 between them. The polarity of the magnet 2a is opposite to that of the magnet 2a opposing the former while interposing the coil 9. In consequence, the carriage 3 can be driven and positioned when the current is supplied to the coil 9 wound in the same direction between the magnets 2a while the power quantity and the current direction are controlled.

Here, the novel point of this invention different from the magnetic disk device of the prior art resides in that the heads 16 are mounted to the first surface of the head arms 3a of the uppermost and lowermost disks 5 of plurality of disks 5 shown in FIG. 2 and dummy suspensions 1 are mounted to their second surface (opposite to the first surface), respectively.

The coil portion 9 of the carriage 3 is inserted between the magnets 2a of the voice coil motor 2 while the counter-yoke 2c of the voice coil motor 2 is removed (FIG. 2), and the counter-yokes 2c are then brought into mutual contact in such a manner as to connect the yokes 2b and are fastened to the yokes 2b by screws. The read/write signals of the head 16 pass through the head arm 3a supporting the head 16 of the carriage 3 by a thin wire (not shown) of the solenoid coil disposed on the head 16 and is transmitted to a read/write control substrate 12 for controlling the read/write signal of the head 16 by an FPC (Flexible Printed Circuit) 14 (FIG. 4), and is further transmitted outside a head disk assembly (hereinafter called the "HDA") by an enclosed type connector 10 bonded to a base 7 made of aluminum or stainless steel or iron and positioned below the lower surface of the read/write control board 12. The enclosed type connector 10 relays the electric signals inside and outside the HDA and completely seals a plurality of pins for transmitting the signals and a mold portion for holding the pins. The current of the coil 9, too, is transmitted to the enclosed type connector 10 through the FPC 14.

The enclosed connector 10 is connected to a circuit board 11 for controlling devices disposed outside the HDA. The driving current of the spindle motor 5 is transmitted to the circuit board 11 by cables and connectors (not shown) from below the motor shaft 6f. A stopper 19 (FIG. 4) is disposed so as to prevent the carriage 3 from moving uncontrollably due to an excessive current beyond a rated value flowing through the coil 9 at the time of any abnormality or to prevent the head 16 from damaging the surface of the disk 5 or to prevent the head 16 from falling off from the surface of the disk 5. The information required for the head 16 to sense the position on the disk 5 must be recorded on the disk 5 by the head 16 of the disk device during the production. Because a current of about 0.1 A is caused to flow through the coil 9 and recording of the information is started from the state where the carriage 3 is kept pushed to the stopper 19, the stopper also plays the role of positioning. The center axes of rotation of the motor shaft 6f and the carriage 3 and the voice coil motor 2 are fixed to the base 7, and a cover 8 made of aluminum or stainless steel or iron is fixed to the base 7, the motor shaft 6f, the center axes of rotation of the motor shaft 6f and the carriage 3 and the voice coil motor 2 by screws. The peripheral portion of each screw hole is recessed lest each screw protrudes from the upper surface of the cover 8 after the screw is fastened. To seal the inside of the HDA from external air, a seal 17 made of an aluminum foil, which has a thickness sufficient to prevent permeation of moisture and has an adhesive layer on one of the surfaces thereof, is bonded to the butt surface between the base 7 and the cover 8 (see FIGS. 1 to 3).

To correctly process the signals in the read or write operation of the information between the head 16 and the disk 5, the HDA having the construction described above must be kept always clean lest any inclusion enters its space and interrupts the magnetic field. Therefore, an internal filter 13 (see FIG. 4) is disposed so as to collect internal dust by air circulation generated by the rotation of the disk 5.

An air-conditioning agent 15 for controlling the humidity inside the HDA or for adsorbing the gas is mounted to set the humidity inside the HDA always to a predetermined range and to adsorb the gas which might affect adversely the contact yield strength between the head 16 and the disk 5. In this way, reliability of the disk device can be improved. A large capacity type magnetic disk device has a plurality of disks 5 to obtain a large storage capacity, and because the heads 16 exist for the surfaces of these disks 5, respectively, disk spacers 18 (FIGS. 1 to 3) are disposed between the disks 5. The gap between the heads 16 is kept constant by accurately finishing the head fitting surface of the carriage 3.

Next, the explanation will be given in detail on the differences of the magnetic disk device shown in FIGS. 1 to 4 from the prior art, that is, the construction wherein the head 16 is mounted to the first surface of the head arm 3a of each of the uppermost and lowermost disks 5 of a plurality of disks 5 via a suspension 20 and the dummy suspension 1 is mounted to the second surface (the surface opposite of the first surface).

Figure 5:
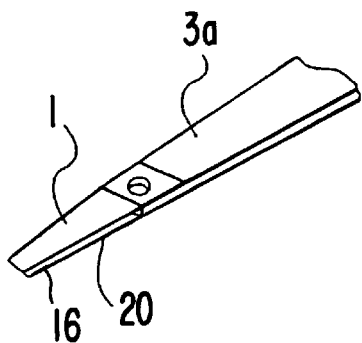
FIG. 5 is a schematic view of a head arm having a dummy suspension mounted to one of the surfaces thereof and one head mounted via a suspension on the opposite surface.
Figure 6:
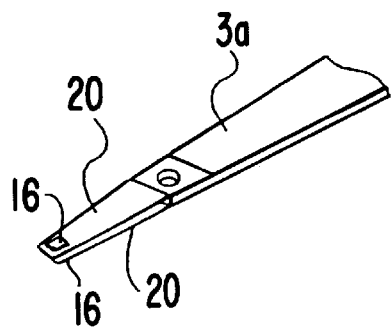
FIG. 6 is a schematic view of a head arm having two heads mounted via suspensions thereto.
Figure 7:
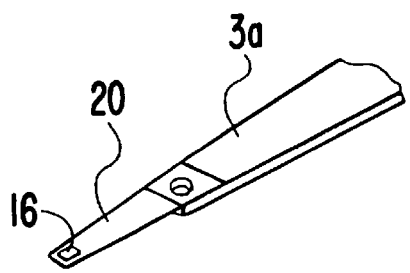
FIG. 7 is a schematic view of a head arm having one head mounted via a suspension thereto.

FIG. 5 is schematic view of the head arm 3a including the dummy suspension 1 mounted to one of the surfaces thereof and one head 16 (inclusive of the gimbal portion having the slider mounted thereto) mounted on the other surface via a suspension. FIG. 6 is schematic view of the head arm 3a (prior art) having two heads 16 mounted thereto via suspensions 20. FIG. 7 is a schematic view of the head arm 3a (prior art) having one head 16 mounted thereto via a suspension 20.

In the head arm 3a having one head 16 shown in FIG. 7 mounted via the suspension 20, the amplitude becomes great because no member for offsetting the vibration of the head 16 exists. In contrast, when the dummy suspension 1 is mounted to the opposite surface of the head arm 3a having one head 16 mounted thereto via the suspension 20 as shown in FIG. 5, the vibration of the head 16 can be offset by the dummy suspension 1, so that the amplitude of the carriage 3 can be reduced. In the dummy suspension 1, the weight balance is taken into consideration by the shape and the sheet thickness so as to generate the same vibration as that of the head when the dummy suspension 1 is mounted to the head arm 3a. In this embodiment, the dummy suspension 1 uses a stainless steel, and the shape is created by press machining so as to generate the same natural frequency as that of the head 16 mounted via the suspension 20. This dummy suspension 1 is fixed to the head arm 3a by swage which is the same means as that of the head 16 or heads 16 mounted via the suspension 20 or suspensions 20 (FIG. 5).

In this embodiment, the outer shape of the dummy suspension 1 (profile when projected in a direction perpendicular to the surface of the magnetic disk) opposing the disk 5 is similar to that of the head 16 mounted via the suspension 20 or does not swell out from the profile of the head 16 mounted via the suspension 20 so that the dummy suspension 1 does not come into contact with the base 7 or the clamp ring 4 or the hub 6a due to swinging of the carriage 3 or the moving range of the head 16 mounted via the suspension 20 eventually narrowed on the surface of the disk 5.

The thickness in the direction perpendicular to the surface of the disk 5, too, must be reduced as much as possible. This embodiment uses the stainless steel sheet, and secures a clearance to such an extent that the distal free end of the dummy suspension 1 does not come into contact with the cover 8 or the base 7 against the impact allowable value of the magnetic disk device. The dummy suspension 1 of this embodiment has a sheet thickness of 0.12 mm and the distal end undergoes deflection of about 0.13 mm at an non-operation impact allowable value of the magnetic disk device.

Figure 8:
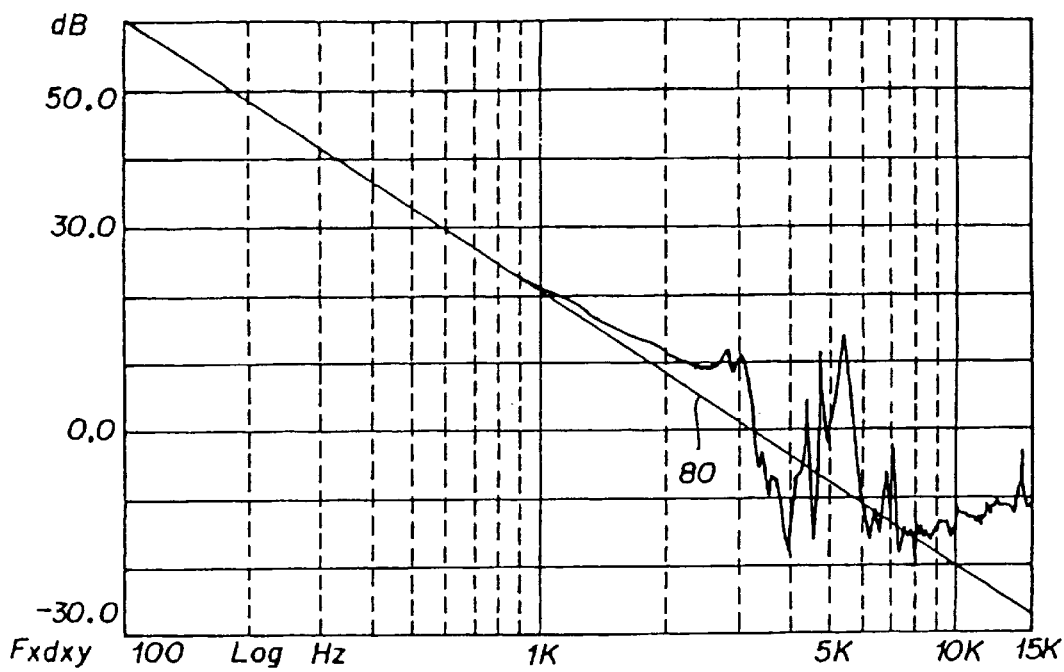
FIG. 8 is a graph showing vibration characteristics of a magnetic disk device equipped with the head arm 3a (FIG. 5) having a dummy suspension 1 and one head 16 mounted via suspension 20 thereto for the uppermost and lowermost disks 5.

FIG. 8 is a graph showing the vibration characteristics of the magnetic disk device of the embodiment of the present invention (the device equipped with the head arm 3a having the dummy suspension 1 and one head 16 mounted thereto via the suspension 20 and provided to the uppermost and lowermost disks 5 (FIG. 5)). The frequency is plotted on the abscissa, and displacement/vibration current=displacement/acceleration is plotted on the ordinate. Since a transmission function expresses a transmission ratio of displacement/acceleration, an idealistic transmission ratio describes a straight line 80 of −40 dB/decade as shown in the graph. Because practical magnetic disk devices have a resonance point, however, the frequency characteristics describe a line somewhat lifted up from the straight line 80. Therefore, the magnitude of the resonance point is expressed by using the line of the straight line 80 as the reference (0).

Figure 9:
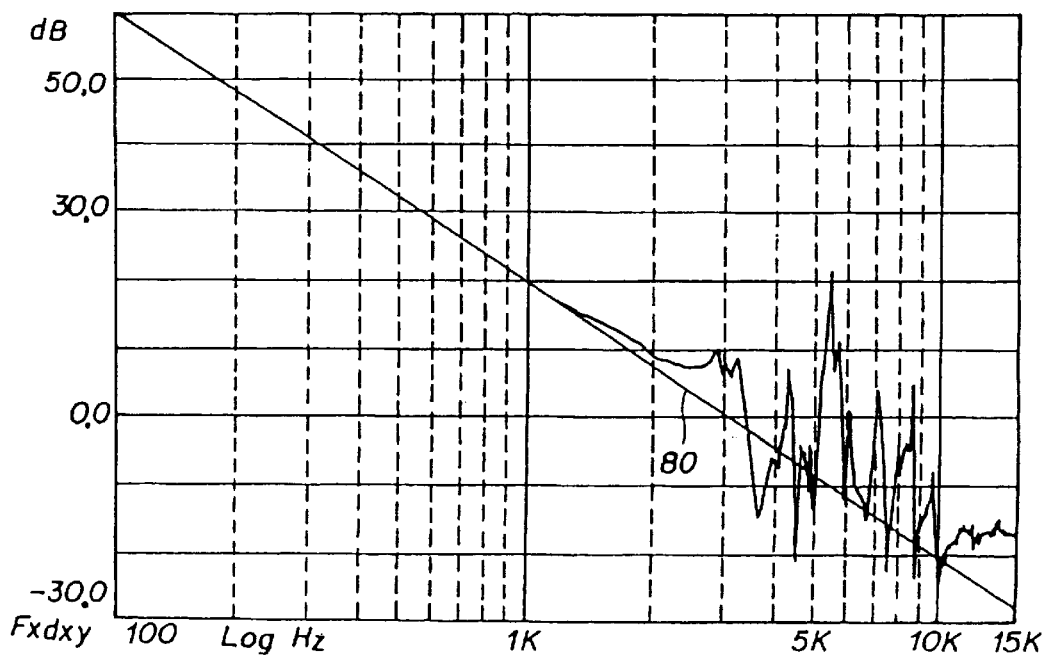
FIG. 9 is graph showing the vibration characteristics of a magnetic disk device equipped with an arm (FIG. 7) having one head mounted thereto via a suspension according to the prior art.

FIG. 9 is a graph showing the vibration characteristics of the magnetic disk device having the head arm 3a having one head 16 mounted thereto via the suspension 20 (prior art; FIG. 7).

In FIG. 9, a peak of about 32 dB (with the straight line 80 being the reference (0) can be seen near the frequency of 5.3 KHz plotted on the abscissa. It has been confirmed that a peak resulting from the vibration of the head arm 3a having one head 16 mounted thereto via the suspension 20 exists at the frequency of 5.3 KHz. In contrast, a value near the frequency of 5.3 KHz plotted on the abscissa in FIG. 8 is about 22 dB (with the straight line 80 being the reference (0)). In comparison with the prior art, the peak drops drastically and a remarkable effect can be recognized.

As described above, the vibration peak value of the carriage 3 can be reduced by far greatly than in the magnetic disk device including the head arm 3a having one head 16 mounted thereto via the suspension 20 as shown in FIG. 7. In consequence, the time before correctly positioning the head 16 to the target position can be shortened and the information processing speed of the magnetic disk device can be improved. Because the gaps between the adjacent information items on the disk 5 can be narrowed, the large storage capacity and high recording density of the magnetic disk device can be accomplished.

Because the dummy suspension 1 has a sheet thickness of 0.12 mm, it is suitable for reducing the size and the thickness of the magnetic disk device.

The present invention can thus provide the magnetic disk device equipped with the positioning mechanism which can restrict the vibration (amplitude) of the head arm at the portion at which one head is mounted, and is suitable for reducing the size and the thickness of the device, for accomplishing the large storage capacity and high recording density and for improving the information processing speed.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk device comprising:

a base and a cover;

a magnetic disk recording information on a recording surface thereof facing said base or said cover;

a spindle motor fixed to said base and rotating said magnetic disk;

a head for recording and reproducing the information to and from said recording surface of the magnetic disk;

a slider having said head mounted thereto;

a first suspension supporting said slider;

a head arm provided between said magnetic disk and said base or said cover and supporting said first suspension on a side of said recording surface;

a second suspension provided on a base side or a cover side of said head arm and having a natural frequency substantially equal to a natural frequency of said first suspension; and a carriage fixed to said base and swinging said head arm, moving said head in a radial direction of said magnetic disk and positioning said head.

2. The magnetic disk device according to claim 1, wherein said second suspension is a dummy suspension supporting a slider and a head which are not used for recording and reproducing to and from said magnetic disk.

3. The magnetic disk device according to claim 1, wherein said second suspension is a suspension which supports no slider and no head.

4. The magnetic disk device according to claim 1, wherein when said second suspension is projected in a vertical direction to said recording surface, said second suspension having a contour which is substantially equal to a contour of said first suspension or which falls within the contour of said first suspension.

5. The magnetic disk device according to claim 1, wherein said second suspension has a structure which is the same as a structure of said first suspension and is mounted on said head arm.

6. A magnetic device comprising:

a base and a cover;

a magnetic disk recording information on recording surfaces thereof facing said base and said cover;

a spindle motor fixed to said base and rotating said magnetic disk;

heads for recording and reproducing the information to and from said recording surfaces of the magnetic disk;

sliders having said head mounted thereto;

first suspensions supporting said sliders;

head arms provided between said magnetic disk and said base and between said magnetic disk and said cover, respectively, and each supporting said first suspension on a side of said recording surface;

second suspensions provided on a base side and a cover side of said head arms, respectively, and each having a natural frequency substantially equal to a natural frequency of said first suspension; and a carriage fixed to said base and swinging said head arms, moving said heads in a radial direction of said magnetic disk and positioning said heads.

7. The magnetic disk device according to claim 6, wherein said second suspension is a dummy suspension supporting a slider and a head which are not used for recording and reproducing to and from said magnetic disk.

8. The magnetic disk device according to claim 6, wherein said second suspension is a suspension which supports no slider and no head.

9. The magnetic disk device according to claim 6, wherein when said second suspension is projected in a vertical direction to said recording surface, said second suspension having a contour which is substantially equal to a contour of said first suspension or which falls within the contour of said first suspension.

10. The magnetic disk device according to claim 6, wherein said second suspension has a structure which is the same as a structure of said first suspension and is mounted on said head arm.

11. A magnetic disk device comprising:

a base and a cover;

a magnetic disk recording information on recording surfaces thereof facing said base and said cover;

a spindle motor fixed to said base and rotating said magnetic disk;

heads for recording and reproducing the information to and from said recording surfaces of the magnetic disk;

sliders having said heads mounted thereto;

a first suspension supporting each of said sliders;

a first head arm provided between said magnetic disk and said base and supporting said first suspension on a side of said recording surface;

a second suspension provided on a base side of said first head arm and having a natural frequency substantially equal to a natural frequency of said first suspension;

a second head arm provided between said magnetic disk and said cover and supporting said first suspension on the side of said recording surface;

a third suspension provided on a cover side of said second head arm and having a natural frequency substantially equal to a natural frequency of said first suspension; and a carriage fixed to said base and swinging said head arms, moving said heads in a radial direction of said magnetic disk and positioning said heads.

12. The magnetic disk device according to claim 11, wherein each of said second suspension and said third suspension is a dummy suspension supporting a slider and a head which are not used for recording and reproducing to and from said magnetic disk.

13. The magnetic disk device according to claim 11, wherein said second suspension is a member which supports no slider and no head.

14. The magnetic disk device according to claim 11, wherein when said second suspension is projected in a vertical direction to said recording surface, said second suspension having a contour which is substantially equal to a contour of said first suspension or which falls within the contour of said first suspension, and said third suspension has a shape substantially equal to a shape of said second suspension.

15. The magnetic disk device according to claim 11, wherein each of said second suspension and said third suspension has a structure which is the same as a structure of said first suspension and is mounted on a corresponding one of said head arms.

16. A magnetic disk device comprising:

a base and a cover;

a first magnetic disk recording information on first recording surfaces thereof facing said base;

a second magnetic disk recording information on second recording surfaces thereof facing said cover;

a spindle motor fixed to said base and rotating said first magnetic disk and said second magnetic disk;

heads each recording and reproducing the information to and from said first recording surface or said second recording surface;

sliders having said heads mounted thereto;

a first suspension supporting each of said sliders;

head arms provided between said first magnetic disk and said base and between said second magnetic disk and said cover and supporting said first suspension on a side of said first recording surface or said second recording surface;

a second suspension provided on a base side or a cover side of said head arm and having a natural frequency substantially equal to a natural frequency of said first suspension; and a carriage fixed to said base and swinging said head arm, moving said head in a radial direction of said magnetic disk and positioning said head; and said base and said cover accommodating said first recording surface, said second recording surface, said heads, said sliders, said first suspension, said head arms, said second suspension and said carriage.

17. The magnetic disk device according to claim 16, wherein said second suspension is a dummy suspension supporting a slider and a head which are not used for recording and reproducing information.

18. The magnetic disk device according to claim 16, wherein said second suspension is a member which supports no slider and no head.

19. The magnetic disk device according to claim 16, wherein when said second suspension is projected in a vertical direction to said recording surface, said second suspension having a contour which is substantially equal to a contour of said first suspension or which falls within the contour of said first suspension.

20. The magnetic disk device according to claim 16, wherein said second suspension has a structure which is the same as a structure of said first suspension and is mounted on said head arm.

\* \* \* \* \*